(12) United States Patent
Shibata

(10) Patent No.: US 6,374,244 B1
(45) Date of Patent: Apr. 16, 2002

(54) DATA TRANSFER DEVICE

(75) Inventor: Tadashi Shibata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/281,902

(22) Filed: Mar. 31, 1999

(30) Foreign Application Priority Data

Apr. 1, 1998 (JP) ............................................ 10-088487

(51) Int. Cl.⁷ .............................................. G06F 17/30
(52) U.S. Cl. ........................... 707/9; 707/4; 712/107; 712/112; 712/124
(58) Field of Search .................... 707/10, 9, 4; 711/151; 710/117, 107, 112, 124, 309, 27

(56) References Cited

U.S. PATENT DOCUMENTS

| | | | |
|---|---|---|---|
| 5,193,189 A | * | 3/1993 | Flood et al. ................. 395/650 |
| 5,533,205 A | | 7/1996 | Blackledge et al. |
| 5,566,306 A | * | 10/1996 | Ishida ........................ 395/309 |
| 5,767,866 A | * | 6/1998 | Chee et al. .................. 345/521 |
| 6,006,303 A | * | 12/1999 | Barnaby et al. ............. 710/244 |
| 6,058,459 A | * | 5/2000 | Owen et al. ................ 711/151 |
| 6,178,486 B1 | * | 1/2001 | Gill et al. .................... 711/151 |

* cited by examiner

Primary Examiner—Jean M. Corrielus
(74) Attorney, Agent, or Firm—McDermott, Will & Emery

(57) ABSTRACT

A data transfer device for transferring plural asynchronous data processed and input/output at different rates includes a memory for storing data. The memory is shared between first through fourth data input/output circuits, and the data are input/output between the memory and the data input/output circuits. Each of the data input/output circuits is previously assigned a priority for access to the memory, and issues an access request at a predetermined time interval. An arbitration device receives the access requests from the data input/output circuits, and gives an access permission to the data input/output circuits issuing the access requests in the descending order of the priorities. Accordingly, the asynchronous data can be real time transferred by using a small circuit scale.

5 Claims, 6 Drawing Sheets

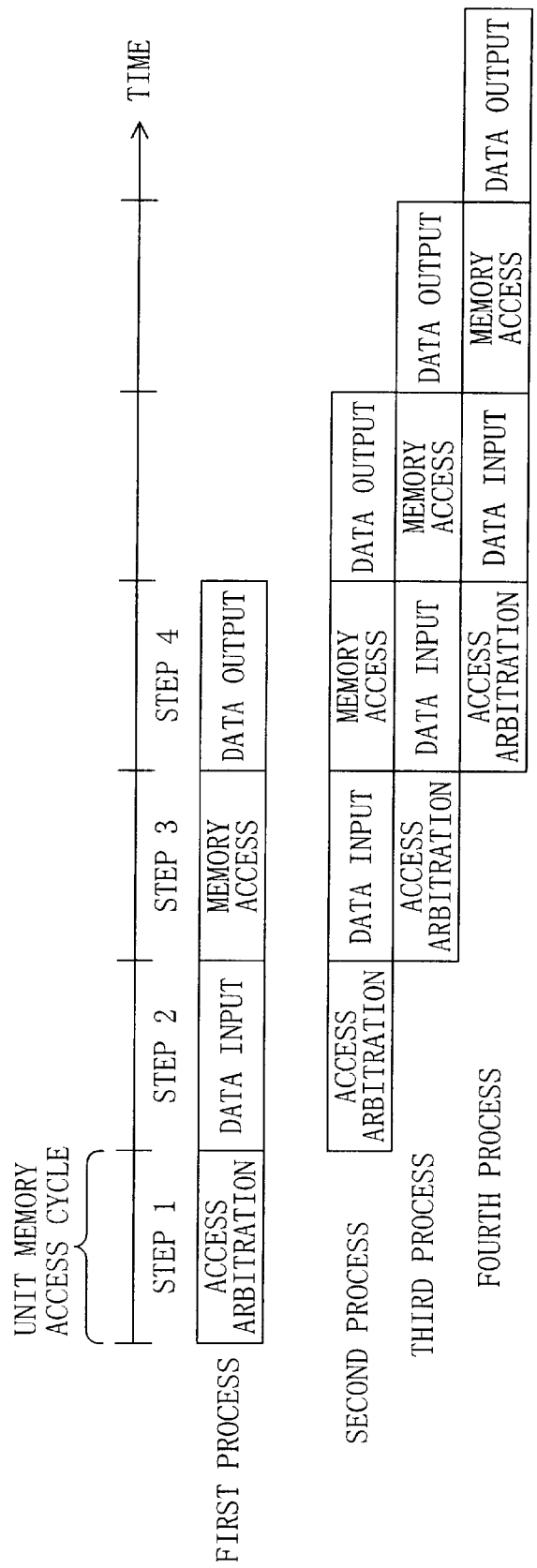

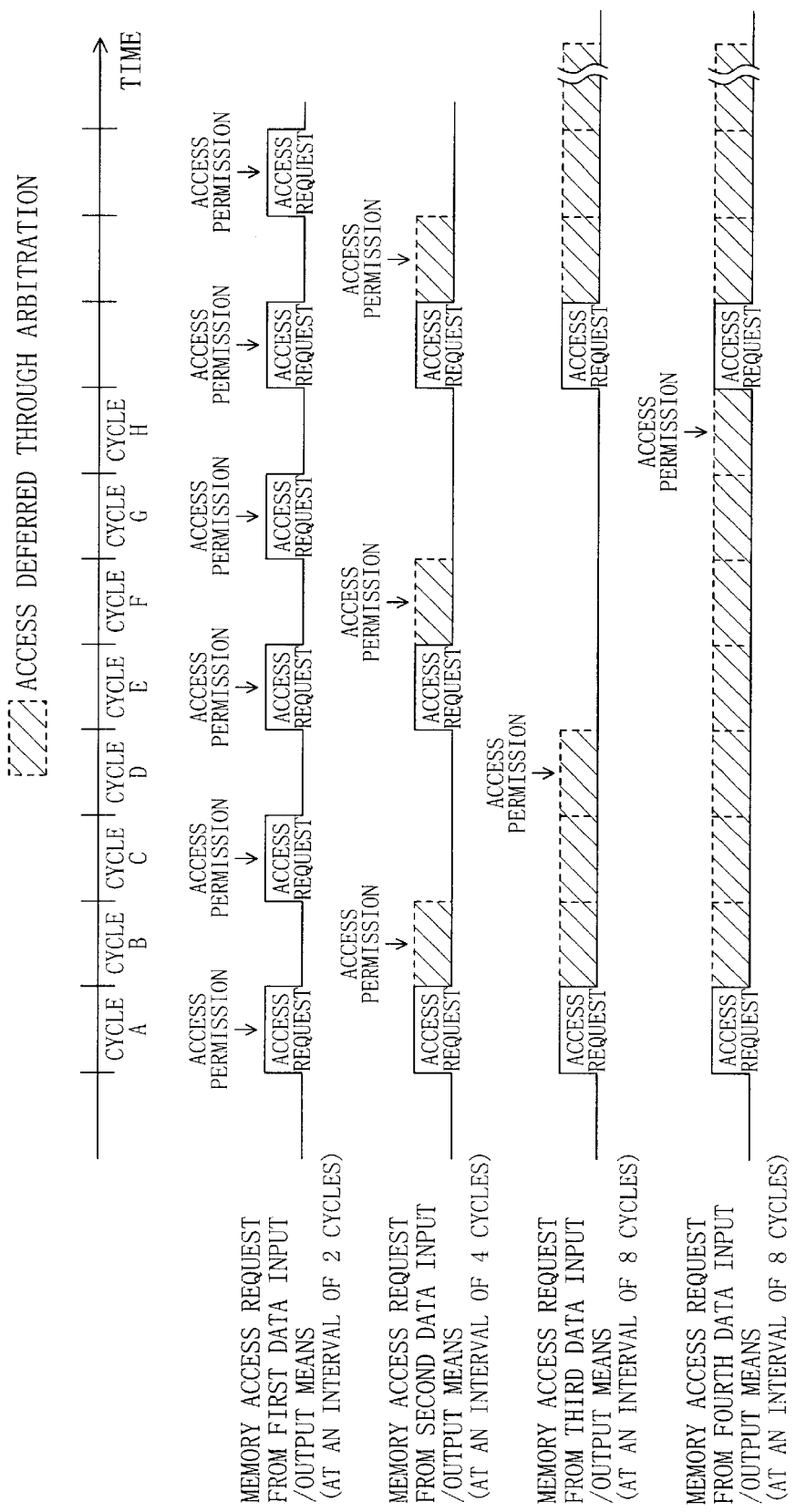

DATA TRANSFER DEVICE

BACKGROUND OF THE INVENTION

The present invention relates to a data transfer device for transferring plural kinds of data.

Recently, the quantity and kinds of data to be processed by an MPEG decoder or the like have increased and the data processing has become complicated. As a result, there is a need for memories with a large capacity. As such memories with a large capacity, a DRAM, an SDRAM or a RAMBUS-DRAM is used in consumer-oriented electronic products. Such memories have a characteristic that the data transfer efficiency is higher when continuous data accesses are made to continuous addresses than when random accesses are made. In an MPEG decoding process, however, the transfer rate of compressed data, the output rate of image signals and the output rate of audio signals are lower than the memory access rate. Accordingly, when a large quantity of compressed data, image data or audio data in the memory such as a DRAM are accessed at a low rate, the memory transfer efficiency of the memory such as a DRAM is largely lowered. As a countermeasure to improve the memory transfer efficiency, buffer memories for temporarily storing a large quantity of compressed data, image data and audio data are provided in a conventional data transfer device, and when data in a given quantity are stored in each of these buffer memories, the stored data are continuously and rapidly transferred to the memory such as a DRAM.

However, the conventional data transfer device includes the buffer memories respectively corresponding to kinds of a large quantity of data such as compressed data, image data and audio data. Therefore, as the number of kinds of data to be processed is increased, the number of memories to be used is increased, and each kind of data is required to be provided with a data transfer bus, and hence, the area for such buses becomes large. As a result, the entire circuit area becomes disadvantageously large.

As a countermeasure against this disadvantage, a data transfer device including one buffer memory shared between plural kinds of asynchronous data is known. This data transfer device includes data input/output circuits for inputting/outputting respective kinds of data, and these data input/output circuits are assigned access priorities for the shared buffer memory. Thus, the access to the shared buffer memory is successively made in the descending order of the access priorities. In addition, each of the data input/output circuits is provided with a second buffer memory, so that, while data are being input/output between one data input/output circuit and the shared buffer memory, other data can be stored in the second buffer memory of the corresponding data input/output circuit.

However, in this data transfer device, the data input/output circuit having a low access priority cannot make an access to the shared buffer memory within a desired time, and the access within a desired time cannot be guaranteed. Specifically, while the access from a data input/output circuit with a highest access priority is permitted in response to every access request so as to guarantee an access within a desired time, an access request from a data input/output circuit with a lower access priority cannot be permitted when the access request competes with an access request from another data input/output circuit with a higher priority. Thus, an access within a desired time cannot be guaranteed in the data input/output circuit with a lower priority. As a result, it is necessary to use a memory with an unnecessarily large capacity as the second buffer memory of a data input/output circuit having a low access priority.

On the other hand, U.S. Pat. No. 5,533,205 describes a technique regarding access priorities. In this technique, a bus access is divided into a series of time frames, and each time frame is subdivided into smaller time intervals. During selected time intervals, arbitration level indicators associated with particular presentation devices to be used for indicating priorities for the bus access are temporarily reordered to guarantee bus access at a data transfer rate required in each data input/output circuit. However, since the priority for the bus access is changed at small time intervals in this technique, a circuit structure required for the change is complicated.

SUMMARY OF THE INVENTION

An object of the invention is providing a data transfer device having a simple structure including one buffer memory shared between plural data input/output circuits, in which transfer of plural kinds of data within desired time periods is guaranteed.

In order to achieve this object, according to the invention, each data input/output circuit is assigned a memory access priority and a memory access request interval.

The data transfer device of this invention comprises plural data input/output means for inputting or outputting data; memory means, serving as a buffer memory, shared by the plural data input/output means for inputting data in or outputting data from the plural data input/output means; and arbitration means for arbitrating access requests for the memory means from the plural data input/output means, wherein each of the plural data input/output means is previously assigned a priority for access to the memory means and is capable of issuing an access request for the memory means at a predetermined time interval, and the arbitration means receives the access requests from the plural data input/output means and gives access permission for the memory means to data input/output means issuing the access requests in the descending order of the priorities.

In one aspect of the data transfer device, the arbitration means gives access permission to data input/output means having a highest priority among the data input/output means issuing the access requests, and each of the data input/output means that is not given the access permission by the arbitration means issues an access request again regardless of the predetermined time interval.

In another aspect of the data transfer device, the arbitration means arbitrates the access requests from the plural data input/output means in every unit access cycle of the memory means.

In still another aspect of the data transfer device, each of the data input/output means includes input means for inputting data; and input data storage means having a capacity sufficient for storing at least data in a quantity input to the input means during a total period including an access request interval for the memory means and a period from issue of the access request to permission of the access request.

In still another aspect of the data transfer device, each of the data input/output means includes output means for outputting data; and output data storage means having a capacity sufficient for storing at least data in a quantity output from the output means during a total period including an access request interval for the memory means and a period from issue of the access request to permission of the access request.

In this manner, according to the present invention, in the plural data input/output means sharing one memory means, time intervals of access requests for the shared memory means from the respective data input/output means are set to be predetermined intervals. Therefore, each of the data input/output means is guaranteed to definitely make an access to the shared memory means within a desired time period. Accordingly, the capacities of second buffer memories included in the respective data input/output means can be previously definitely grasped. As a result, the capacities of the second buffer memories can be decreased as compared with those in the conventional technique.

In particular, when the arbitration of the access requests from the data input/output means is conducted in every unit access cycle of the memory means, the capacities of the second buffer memories of the respective data input/output means can be suppressed to necessary minimum capacities.

Furthermore, the data storage capacity of each data input/ output means can be definitely determined as the capacity for storing at least data in a quantity input/output during the total period including the access request interval for the memory means and the period from issue of the access request to the permission of the access request.

BRIEF DESCRIPTION OF THE DRAWINGS

FIG. 7 is a timing chart for memory accesses made in the embodiment; and

FIG. 8 is a timing chart for memory arbitration conducted in the embodiment.

DETAILED DESCRIPTION OF THE INVENTION

Now, a preferred embodiment of the invention will be described with reference to the accompanying drawings.

In this embodiment, processes in real time transfer of two data streams, one of which is a decoding output process of MPEG audio data and the other of which is a decoding output process of MPEG image data, will be exemplified.

Figure 1:
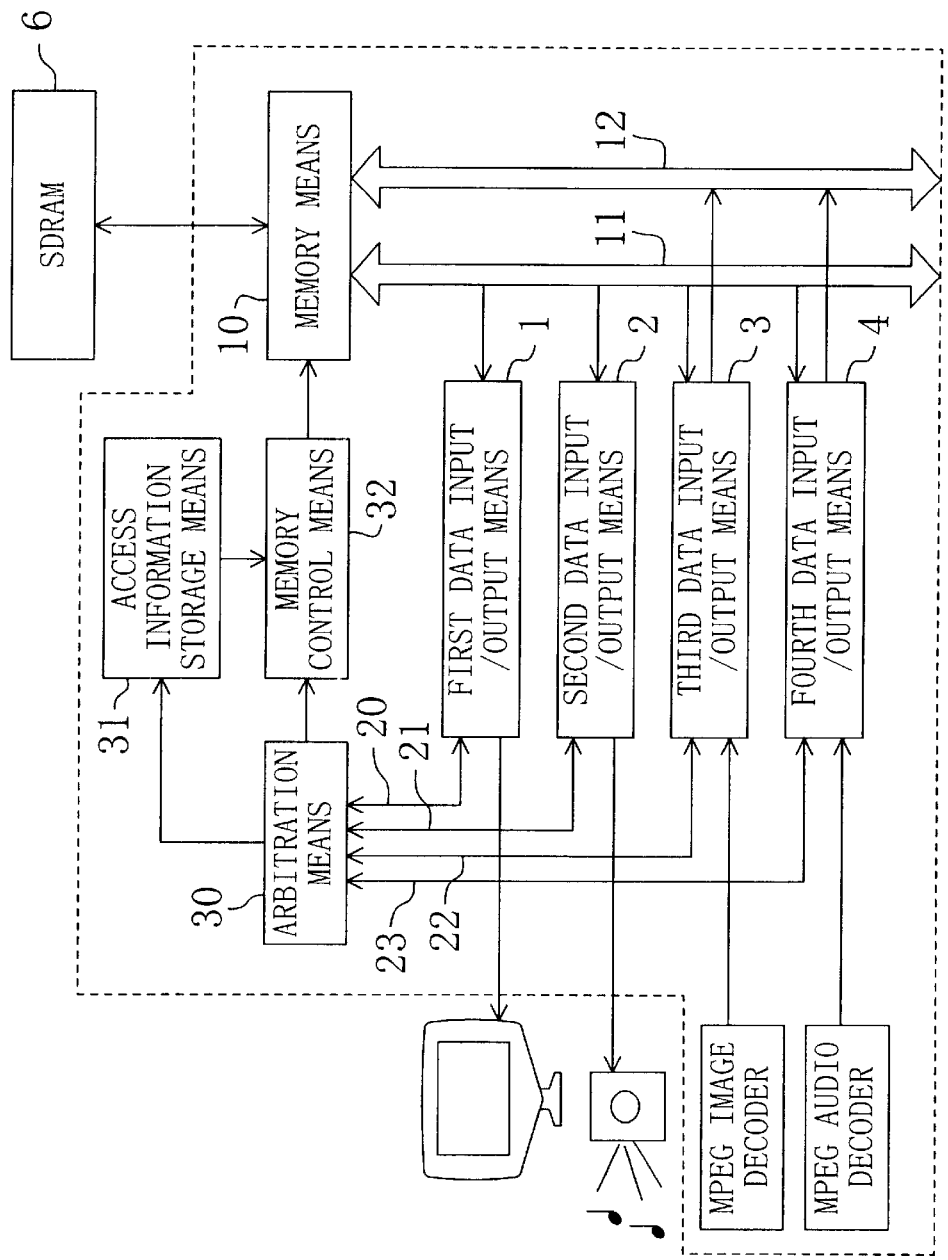
FIG. 1 is a block diagram of a data transfer device according to an embodiment of the invention.

FIG. 1 is a block diagram of a data transfer device according to the embodiment of the invention. In FIG. 1, memory means (buffer memory) 10 has a function to store data, and specifically is an SRAM having a minimum access cycle of 20 ns (nanoseconds) and a storage capacity of 4 KB. The memory means 10 inputs data to and outputs data from another memory means 6 including an SDRAM disposed out of one chip surrounded with a broken line in FIG. 1.

Figure 2:
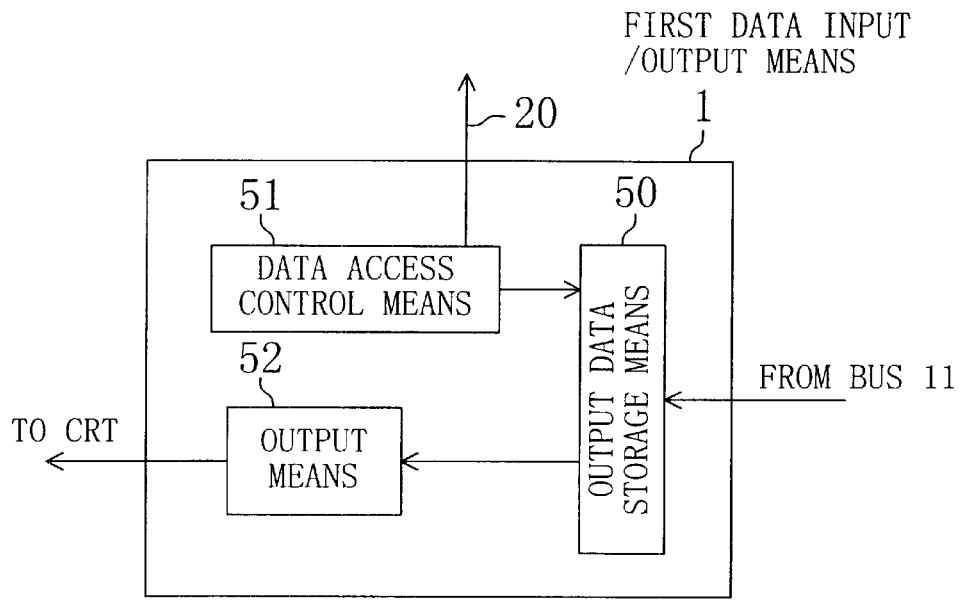
FIG. 2 is a block diagram of first data input/output means of the embodiment.

First data input/output means 1 outputs image data, is assigned a highest level "0" as the memory access priority for access to the memory means 10, and is capable of issuing a memory access request signal 20 to arbitration means 30 at an interval of 2 cycles or more. Herein, a memory access priority of a lower level means higher priority. FIG. 2 is a block diagram of the first data input/output means 1. In the first data input/output means 1 of FIG. 2, output data storage means 50 stores data read from the memory means 10. Data access control means 51 manages an effective data quantity of the output data storage means 50, and issues the memory access request signal 20 to the arbitration means 30. Output means 52 has a function to output the data from the output data storage means 50 to a CRT, and is specifically a D/A convertor for a video system.

Figure 3:
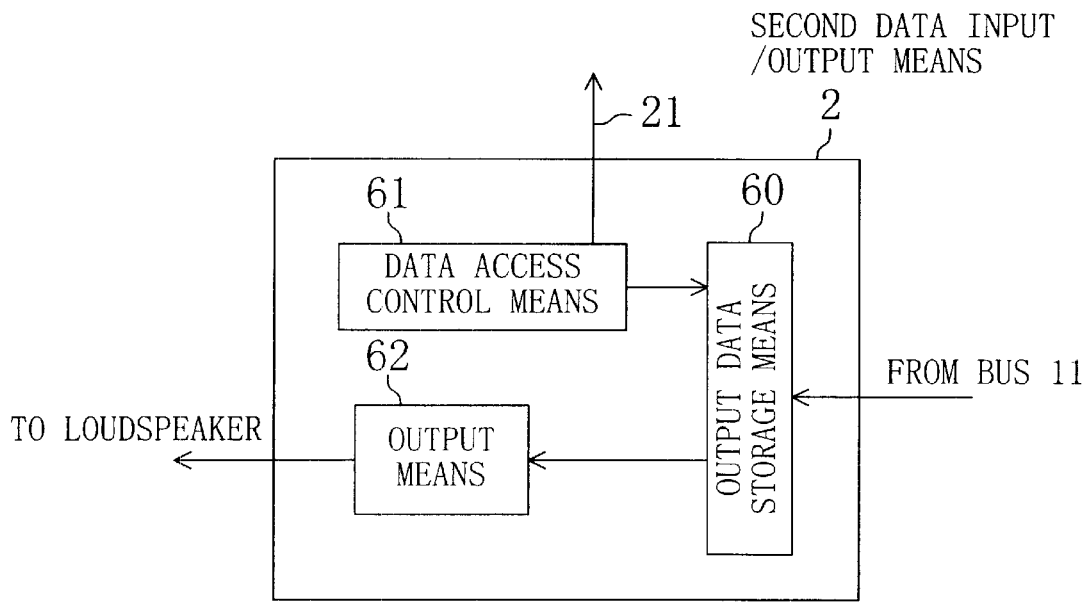
FIG. 3 is a block diagram of second data input/output means of the embodiment.

Referring to FIG. 1, second data input/output means 2 outputs audio data, is assigned a level "1" as the memory access priority for the access to the memory means 10, and is capable of issuing a memory access request signal 21 to the arbitration means 30 at an interval of 4 cycles or more. When the access is not permitted through arbitration, the second data input/output means 2 successively issues the memory access request signal 21. FIG. 3 is a block diagram of the second data input/output means 2. In the second data input/output means 2 of FIG. 3, output data storage means 60 stores data read from the memory means 10. Data access control means 61 manages an effective data quantity of the output data storage means 60, and issues the memory access request signal 21 to the arbitration means 30. Output means 62 has a function to output the data from the output data storage means 60 to a loudspeaker, and is specifically a D/A convertor for audio signals or a data format converting output circuit according to the IEC 956 standard.

Figure 4:
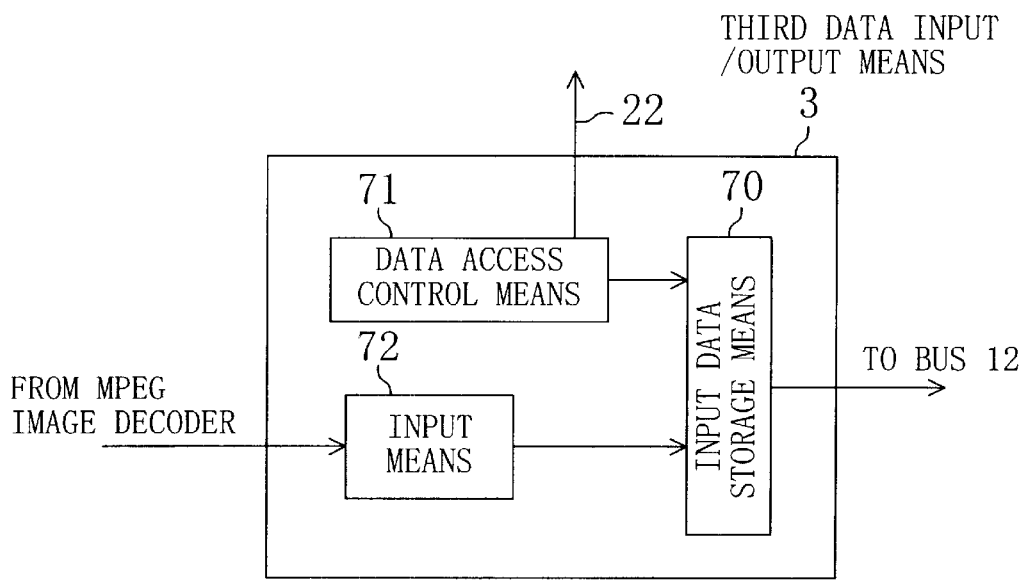
FIG. 4 is a block diagram of third data input/output means of the embodiment.

Referring to FIG. 1, third data input/output means 3 outputs decoded image data obtained by decoding MPEG coded image data so as to write the decoded image data in the memory means 10. The third data input/output means 3 is assigned a level "2"as the memory access priority, and is capable of issuing a memory access request signal 22 to the arbitration means 30 at an interval of 8 cycles or more. When the access is not permitted through the arbitration, the third data input/output means 3 successively issues the memory access request signal 22. FIG. 4 is a block diagram of the third data input/output means 3. In the third data input/ output means 3 of FIG. 4, input means 72 inputs data processed by an MPEG image decoder. Input data storage means 70 stores the input data to be written in the memory means 10. Data access control means 71 manages an effective data quantity of the input data storage means 70, and issues the memory access request signal 22 to the arbitration means 30.

The third data input/output means 3 receives the data obtained by decoding the MPEG coded image data at the input means 72 and writes the received data in the input data storage means 70. The data access control means 71 checks the input data storage means 70, so as to issue the memory access request signal 22 to the arbitration means 30 when the input data storage means 70 stores effective data writable in the memory means 10 and when an interval between previous memory access request and current memory access request is equal to or larger than the access request interval assigned to the third data input/output means 3. When the arbitration means 30 permits the third data input/output means 3 to access the memory means 10, the data access control means 71 outputs the data stored in the input data storage means 70 to an input bus 12.

Figure 5:
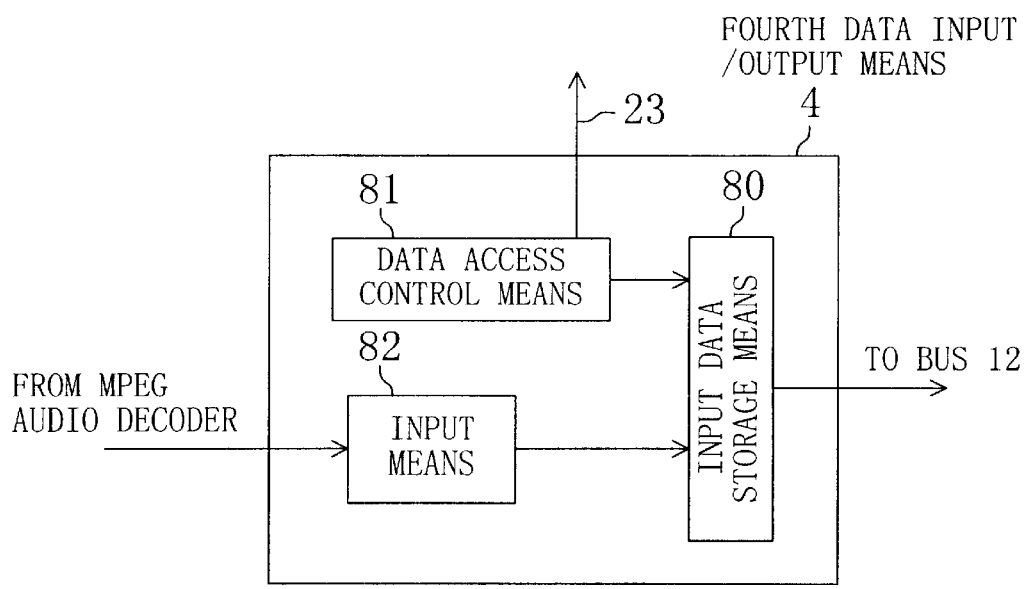
FIG. 5 is a block diagram of fourth data input/output means of the embodiment.

Referring to FIG. 1 again, fourth data input/output means 4 outputs decoded audio data obtained by decoding MPEG coded audio data so as to write the decoded audio data in the memory means 10. The fourth data input/output means 4 is assigned a level "3" as the memory access priority, and is capable of issuing a memory access request signal 23 to the arbitration means 30 at an interval of 8 cycles or more. When the access is not permitted through the arbitration, the fourth data input/output means 4 successively issues the memory access request signal 23. FIG. 5 is a block diagram of the fourth data input/output means 4. In the fourth data input/output means 4 of FIG. 5, input means 82 inputs data processed by an MPEG audio decoder. Input data storage means 80 stores the input data to be written in the memory means 10. Data access control means 81 manages an effective data quantity of the input data storage means 80, and issues the memory access request signal 23 to the arbitration means 30.

In FIG. 1, an output bus 11 is a bus for transferring data read from the memory means 10 to the first through fourth data input/output means 1 through 4, and the input bus 12 is a bus for transferring data output from the third and fourth data input/output means 3 and 4 to be written in the memory means 10.

The arbitration means 30 checks the data access request signals 20 through 23, so as to arbitrate the memory access to the memory means 10 in every minimum access cycle of the memory means 10 (i.e., every 20 ns) on the basis of the memory access priorities assigned to the respective data input/output means 1 through 4.

Access information storage means 31 stores access information on the accesses to the memory means 10 from the data input/output means 1 through 4 (including information on addresses in the memory means 10 accessed by the plural data input/output means 1 through 4 and read/write information indicating a read or write operation). The access information storage means 31 issues, to the memory means 10, the access information on one of the data input/output means having gained access permission as a result of the arbitration by the arbitration means 30, and updates the access information for a subsequent memory access.

Figure 6:
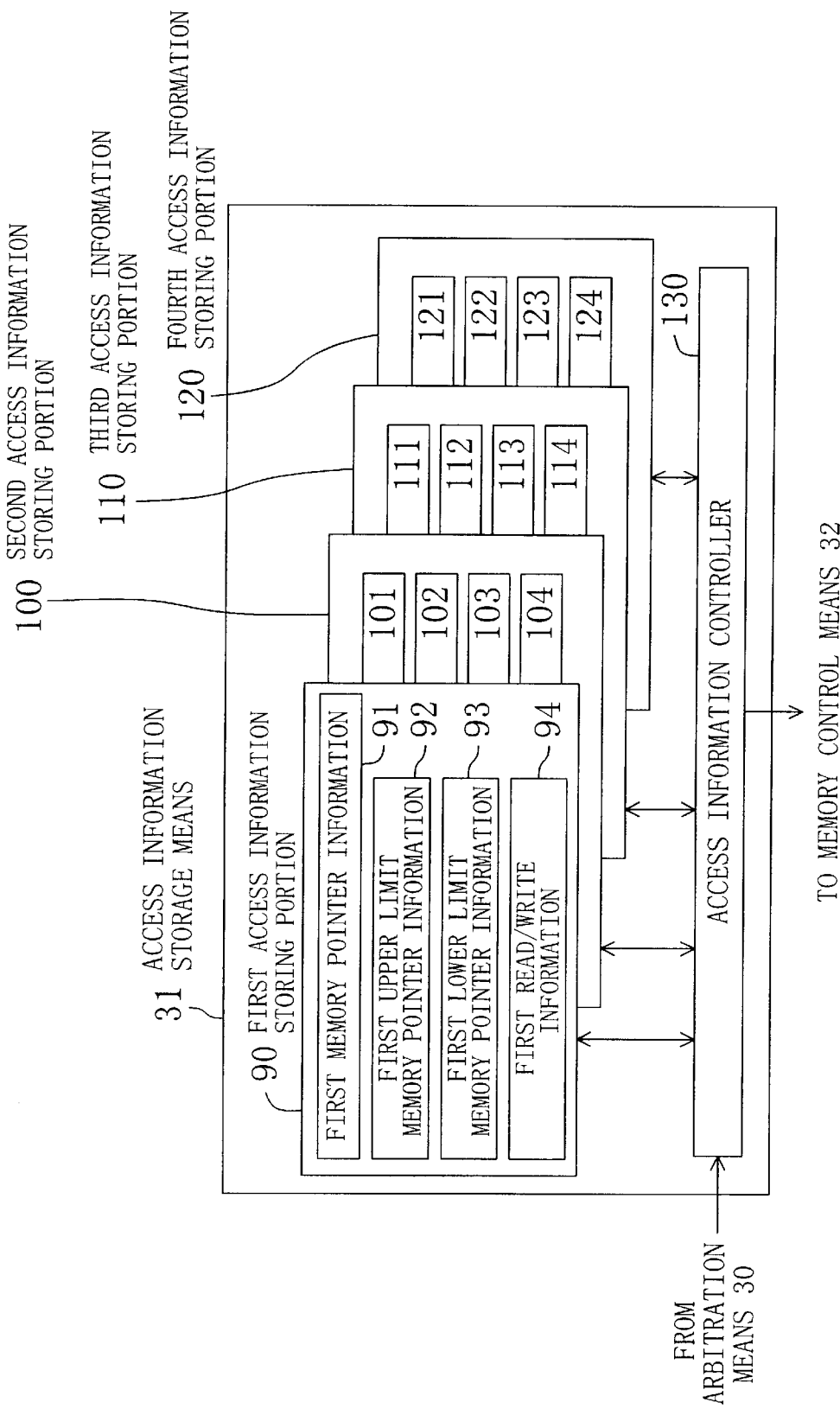
FIG. 6 is a block diagram of access information storage means of the embodiment.

FIG. 6 is a block diagram of the access information storage means 31. In FIG. 6, first through fourth access information storing portions 90, 100, 110 and 120 store the access information of the first through fourth data input/output means 1 through 4, respectively.

First memory pointer information 91, second memory pointer information 101, third memory pointer information 111 and fourth memory pointer information 121 store address values (address information) to be written in or read from the memory means 10 by the first through fourth data input/output means 1 through 4, respectively. First upper limit memory pointer information 92, second upper limit memory pointer information 102, a third upper limit memory pointer information 112 and fourth upper limit memory pointer information 122 correspond to the maximum possible pointer values (high limit addresses) of the first through fourth memory pointer information 91, 101, 111 and 121, respectively. First lower limit memory pointer information 93, second lower limit memory pointer information 103, third lower limit memory pointer information 113 and fourth lower limit memory pointer information 123 correspond to the possible minimum pointer values (initial addresses) of the first through fourth memory pointer information 91, 101, 111 and 121, respectively. First read/write information 94, second read/write information 104, third read/write information 114 and fourth read/write information 124 correspond to control information indicating which of a read access or a write access is to be made to the memory means 10 by the first through fourth data input/output means 1 through 4, respectively.

Access information controller 130 updates and controls the memory pointer information managed by the access information storing portions 90, 100, 110 and 120, and outputs the access information of the data input/output means arbitrated by the arbitration means 30 to memory control means 32.

In FIG. 1, the memory control means 32 outputs, to the memory means 10, the address information output by the access information storage means 31 and a read/write control signal necessary for the data access.

FIG. 7 is an operation timing chart for the memory control means 32. Referring to FIG. 7, in Step 1, the arbitration means 30 checks the memory access request signals 20 through 23 issued by all the data input/output means 1 through 4, and gives access permission to the data input/output means issuing the memory access request signal and having the highest priority in every unit memory access cycle of the memory means 10.

In Step 2, if the data input/output means having gained the access permission from the arbitration means 30 is to output data to (write data in) the memory means 10, the data input/output means outputs the data to be written in the memory means 10 to the input bus 12.

In Step 3, the access information storage means 31 outputs the access information corresponding to the data input/output means arbitrated in Step 1. The memory control means 32 outputs the address information and the read/write control signal to be used in the memory access to the memory means 10 on the basis of the access information output by the access information storage means 31. The access information controller 130 updates the memory pointer information of the data input/output means having gained the access permission in Step 1 for a subsequent data access.

In Step 4, if the memory access selected in Step 3 is a read access, the memory control means 32 outputs the data read from the memory means 10 to the output bus 11.

The procedures in Steps 1 through 4 are successively executed in every unit memory access cycle of the memory means 10 so that the procedures in Steps 1 through 4 can be carried out in parallel. Therefore, in every unit memory access cycle, data from the same or different data input/output means can be arbitrated for the memory access.

The arbitration means 30 executes the arbitration in every unit memory access cycle. In this embodiment, when all the data input/output means 1 through 4 issue the data access request signals, the data input/output means 1 having the highest priority gains the data access permission. FIG. 8 is a timing chart of the memory arbitration conducted in this embodiment. Now, with regard to each of the first through fourth data input/output means 1 through 4, a maximum period (time duration) necessary from the issue of the memory access request to the gain of the access permission will be described with reference to FIG. 8. As described above, the priority for the memory access to the memory means 10 is decreased in the order of the first data input/output means 1, the second data input/output means 2, the third data input/output means 3 and the fourth data input/output means 4. The intervals of issuing the memory access request signals for the shared memory means 10 from the first through fourth data input/output means 1 through 4 are 2 cycles, 4 cycles, 8 cycles and 8 cycles, respectively.

In FIG. 8, each of cycles A through H corresponds to a unit memory access cycle.

First, in the cycle A, since the first through fourth data input/output means 1 through 4 issue the memory access requests, the arbitration means 30 issues memory access permission to the first data input/output means 1 having the highest priority.

In the cycle B, the second through fourth data input/output means 2 through 4 which cannot gain the memory access permission in the cycle A successively issue the memory access requests. Therefore, the arbitration means 30 issues the memory access permission to the second data input/output means 2 having the highest memory access priority among the data input/output means 2 through 4 from which the access requests are received.

In the cycle C, since the first data input/output means 1 issues one memory access request every two cycles at minimum, the arbitration means 30 issues the memory access permission to the first data input/output means 1.

In the cycle D, the third and fourth data input/output means 3 and 4 which cannot gain the access permission in the cycle C successively issue the memory access requests. Therefore, the arbitration means 30 issues the memory access permission to the third data input/output means 3 having the higher priority among the data input/output means 3 and 4 from which the access requests are received.

In the cycle E, the first data input/output means 1, the second data input/output means 2 and the fourth data input/output means 4 issue the memory access requests, and the arbitration means 30 issues the memory access permission to the first data input/output means 1 having the highest memory access priority among the data input/output means 1, 2 and 4 from which the access requests are received.

Thereafter, the arbitration means 30 arbitrates the memory access similarly, so that the fourth data input/output means 4 can gain the data access permission in the cycle H.

Accordingly, the first data input/output means 1 can gain the data access permission one cycle, including the cycle when the data access request is issued, after the issue of the data access request. Similarly, the second data input/output means 2, the third data input/output means 3 and the fourth data input/output means 4 can gain the data access permissions 2 cycles, 4 cycles and 8 cycles, respectively including the cycles when the data access requests are issued, after the issue of the data access requests, respectively. In a cycle when the access permission is given, data in a quantity corresponding to the storage capacity of the data storage means 50, 60, 70 or 80 are input in or output from the shared memory means 10 by each of the data input/output means 1 through 4.

As is understood from the above description, the intervals of issuing the access requests from the first through fourth data input/output means 1 through 4 are 2, 4, 8 and 8 cycles, respectively, and the access intervals (intervals from the issue of the access requests to actual memory accesses) thereof are 1, 2, 4 and 8 cycles. Therefore, each data input/output means is guaranteed the memory access within the access request interval.

Next, the data storage capacities of the data storage means 50, 60, 70 and 80 included in the data input/output means 1 through 4 will be described. In the fourth data input/output means 4, the access request interval is 8 cycles, and the period from the issue of an access request to permission of the access request is 7 cycles as is understood from FIG. 8. Accordingly, in assuming the worst case where the data input/output means 1 through 3 having the higher priorities than the data input/output means 4 do not issue an access request in a current cycle but issue access requests in a subsequent cycle, the input data storage means 80 of the fourth data input/output means 4 is set to have a capacity for at least storing data in a quantity received from the input means 82 in a total period (15 cycles) of the access request interval (8 cycles) and the period from the issue of an access request to the permission of the access request (7 cycles).

Similarly, the input data storage means 70 of the third data input/output means 3 is set to have a capacity for at least storing data in a quantity received from the input means 72 in a total period (11 cycles) of the access request interval (8 cycles) and the period from the issue of an access request to the permission of the access request (3 cycles).

Similarly, the output data storage means 60 of the second data input/output means 2 is set to have a capacity for at least storing data in a quantity output to the output means 62 in a total period (5 cycles) of the access interval (4 cycles) and the period from the issue of an access request to the permission of the access request (1 cycle).

Furthermore, the output data storage means 50 of the first data input/output means 1 is set to have a capacity for at least storing data in a quantity output to the output means 52 in a total period (2 cycles) of the access interval (2 cycles) and the period from the issue of an access request to the permission of the access request (0 cycle).

In the conventional technique, the memory access intervals (the intervals from the issue of access requests to actual accesses) are not specified in the respective data input/output means 1 through 4. Therefore, the data input/output means having a lower memory access priority (for example, the fourth data input/output means 4) cannot assume a waiting time before the memory access as a given time period, and hence, the capacity of the input data storage means 80 cannot be specified. As a result, real time data transfer becomes difficult.

In contrast, the plural data input/output means 1 through 4 share the shared memory means 10 in this embodiment, and the priorities for the access to the shared memory means 10 and the intervals of the memory access requests are assigned to the respective data input/output means 1 through 4. The arbitration means 30 arbitrates the memory access requests on the basis of the priorities in each unit access cycle of the memory means 10. Therefore, the capacities of the output data storage means 50 and 60 and the input data storage means 70 and 80 of the data input/output means 1 through 4 can be specified as the above-described predetermined capacities. Thus, the real time data transfer can be realized.

In this embodiment, the first through fourth data input/output means 1 through 4 successively output the memory access request signals 20 through 23 when their memory access requests are not permitted, which does not limit the invention. For example, the data input/output means 1 through 4 outputs the memory access request signals 20 through 23 at the predetermined intervals alone. When the arbitration means 30 simultaneously receives the memory access request signals from two or more data input/output means, the following cycles are repeated: In one cycle, the access permission is given to the data input/output means having the highest priority for the memory access; and in a subsequent cycle, the access permission is given to the data input/output means having the second highest priority.

Furthermore, in this embodiment, the arbitration means 30 arbitrates the access requests in every unit access cycle of the memory means 10, which does not limit the invention. However, when the access request is arbitrated in every unit access cycle, the invention can exhibit an effect that the capacities of the output data storage means 50 and 60 and the input data storage means 70 and 80 can be suppressed to necessary and minimum capacities.

Moreover, although the number of data input/output means for making data accesses to the memory means 10 is four in this embodiment, the operation and the effects of the embodiment are basically the same even when the number is larger.

Also, the first data input/output means 1 outputs image data, the second data input/output means 2 outputs audio data, the third data input/output means 3 decodes MPEG image data, and the fourth data input/output means 4 decodes MPEG audio data in this embodiment. However, the processes to be conducted and the data to be processed are not herein specified as far as the data input/output means are means for inputting data to or outputting data from the memory means 10.

What is claimed is:

1. A data transfer device comprising:

plural data input/output means for inputting or outputting data;

memory means shared by said plural data input/output means for inputting data in or outputting data from said plural data input/output means; and arbitration means for arbitrating access requests for said memory means from said plural data input/output means, wherein each of said plural data input/output means is previously assigned a fixed priority for access to said memory means and is capable of issuing an access request for said memory means at a predetermined time interval, and said arbitration means receives the access requests from said plural data input/output means and gives access permission for said memory means to data input/output means issuing the access requests in the descending order of said priorities.

2. The data transfer device of claim 1, wherein said arbitration means gives access permission to data input/output means having a highest priority among said data input/output means issuing the access requests, and each of said data input/output means that is not given the access permission by said arbitration means issues an access request again regardless of said predetermined time interval.

3. The data transfer device of claim 1, wherein said arbitration means arbitrates the access requests from said plural data input/output means in every unit access cycle of said memory means.

4. The data transfer device of claim 1, 2 or 3, wherein each of said data input/output means includes:

input means for inputting data; and input data storage means having a capacity sufficient for storing at least data in a quantity input to said input means during a total period including an access request interval for the memory means and a period from issue of the access request to permission of the access request.

5. The data transfer device of claim 1, 2 or 3, wherein each of said data input/output means includes:

output means for outputting data; and output data storage means having a capacity sufficient for storing at least data in a quantity output from said output means during a total period including an access request interval for the memory means and a period from issue of the access request to permission of the access request.

* * * * *